(12) United States Patent
Poetsch et al.

(10) Patent No.: US 8,191,693 B2
(45) Date of Patent: Jun. 5, 2012

(54) VIBRATION DAMPER

(75) Inventors: Guenter Poetsch, Muehlacker (DE);
Michael Klandt, Remseck (DE); Achim Schulz, Niefern-Oeschelbronn (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 924 days.

(21) Appl. No.: 11/741,303

(22) Filed: Apr. 27, 2007

(65) Prior Publication Data

US 2007/0251778 A1    Nov. 1, 2007

(30) Foreign Application Priority Data

Apr. 29, 2006    (DE) .................. 10 2006 020 066

(51) Int. Cl.
*F16F 9/00* (2006.01)
(52) U.S. Cl. .............. 188/314; 188/322.19; 188/321.11
(58) Field of Classification Search .................. 188/313, 188/314, 321.11, 322.19
See application file for complete search history.

(56) References Cited

U.S. PATENT DOCUMENTS

| | | | | |
|---|---|---|---|---|
| 4,010,829 A | * | 3/1977 | Naito et al. | 188/278 |
| 4,273,220 A | | 6/1981 | Tilkens | |
| 4,298,102 A | * | 11/1981 | Nishikawa et al. | 188/282.6 |
| 5,988,332 A | | 11/1999 | Marzocchi et al. | |
| 6,220,408 B1 | | 4/2001 | Pradel et al. | |
| 7,472,772 B2 | * | 1/2009 | Ozeki | 180/218 |

FOREIGN PATENT DOCUMENTS

| | | |
|---|---|---|
| DE | 848 457 | 7/1949 |
| DE | 920 230 | 7/1949 |
| DE | 1 195 615 | 12/1958 |
| DE | 1 863 823 | 12/1962 |
| DE | 197 50 414 C2 | 3/1998 |
| JP | 2004257493 A | 9/2004 |

OTHER PUBLICATIONS

European Search Report dated Jul. 27, 2007 with an English translation of the pertinent portion (three (3) pages).

* cited by examiner

*Primary Examiner* — Bradley King

(57) ABSTRACT

A vibration damper has a working cylinder and a working piston axially displaceable therein. A compensation cylinder has a compensation piston axially displaceable therein. The compensation cylinder is situated at the longitudinal end of the working cylinder and diagonally thereto.

11 Claims, 2 Drawing Sheets

VIBRATION DAMPER

RELATED APPLICATIONS

This application claims the benefit of priority under 35 U.S.C. §1.119, to German Patent Application No. 102006020066, filed Apr. 29, 2006, the disclosure of which is incorporated by reference herein in its entirety.

BACKGROUND AND SUMMARY OF THE INVENTION

The present invention relates to a vibration damper, in particular a single-tube shock absorber.

In single-cylinder vibration dampers, which are divided into two working chambers by a piston which is movable back and forth, it is necessary to provide volume compensation, which is required as a result of the uneven displacement of the damper liquid by the piston rod. A volume compensation of this type may be provided by elements and/or compressible media that are situated in a working chamber opposite to the piston rod.

Vibration dampers are known, for example, from DE 197 50 414 C2 and DE 18 63 823.

A vibration damper having a working cylinder and a working piston axially displaceable therein is disclosed in DE 1 195 615. The working piston divides the working cylinder into a first and a second working chamber. Furthermore, the known vibration damper comprises a compensation cylinder having a compensation piston situated so it is axially displaceable therein, so that the compensation cylinder is divided into a first and second working chamber. The first working chamber of the compensation cylinder is filled with liquid and is connected to the second working chamber of the working cylinder via a comparatively narrow throttle channel. A spring, which presses against the sealed compensation piston, is provided in the second working chamber of the compensation cylinder, which is not filled with liquid. In the known vibration damper, the compensation cylinder is rotated by 90° in relation to the working cylinder. The disadvantage in this case is that the compensation cylinder is situated on the front end of the working cylinder, at an especially highly loaded point of the vibration damper, because of which a wall of the compensation cylinder must be implemented as appropriately thick and thus the vibration damper as such has a relatively high weight.

An object of the present invention is to provide an improved vibration damper which addresses the available installation space in the area of the vibration damper that is becoming smaller and smaller.

This object has achieved according to the present invention by providing that the compensation cylinder is at and diagonal to the longitudinal end of the working cylinder.

The present invention is based on the general concept, in a vibration damper according to the species having a working cylinder and a compensation cylinder. In a known way, the vibration damper according to the present invention comprises a working cylinder having a working piston axially displaceable therein, which piston divides the working cylinder into a first and second working chamber, as well as a compensation cylinder having a compensation piston, which divides the compensation cylinder into a first and a second working chamber, and the first working chamber of the compensation cylinder being pressure-connected to the second working chamber of the working cylinder.

It is especially advantageous in regard to the compensation cylinder situated at the longitudinal end of the working cylinder in a diagonal position that an available installation space in the area of a vehicle connection which has small dimensions may be constructively used advantageously in this way. Due to the diagonal configuration of the compensation cylinder, a free space in the form of a hollow channel arises in the connection area of the vibration damper to the suspension, which may be used, for example, for a driveshaft passage.

According to an advantageous refinement of the present invention, the second working chamber of the compensation cylinder is filled with the gas. A gas is a compressible medium that is favorable in comparison to compressible elements known from the prior art, such as elastic materials or springs, and is simultaneously free of wear. Depending on the applied pressure in the second working chamber of the compensation cylinder and/or depending on the dimension of the volume of the compensation cylinder, the damping properties of the vibration damper may additionally be easily influenced in this way.

According to an especially preferred embodiment of the present invention, the compensation cylinder is integrated in a damper fork. It is contemplated in this case that the damper fork is produced as a one-piece component, by which a later attachment and/or mounting of the compensation cylinder on the damper fork may be dispensed with. Production costs can thus be reduced by integrating the compensation cylinder in the damper fork.

The longitudinal central axis of the compensation cylinder is expediently inclined approximately 10 to 60° to the longitudinal central axis of the working cylinder. From this range of inclination, it is already clear that the configuration of the compensation cylinder on the front end of the working cylinder may be selected as a function of the available installation space and the available installation space may thus be used especially effectively.

DETAILED DESCRIPTION OF THE DRAWINGS

Figure 1:
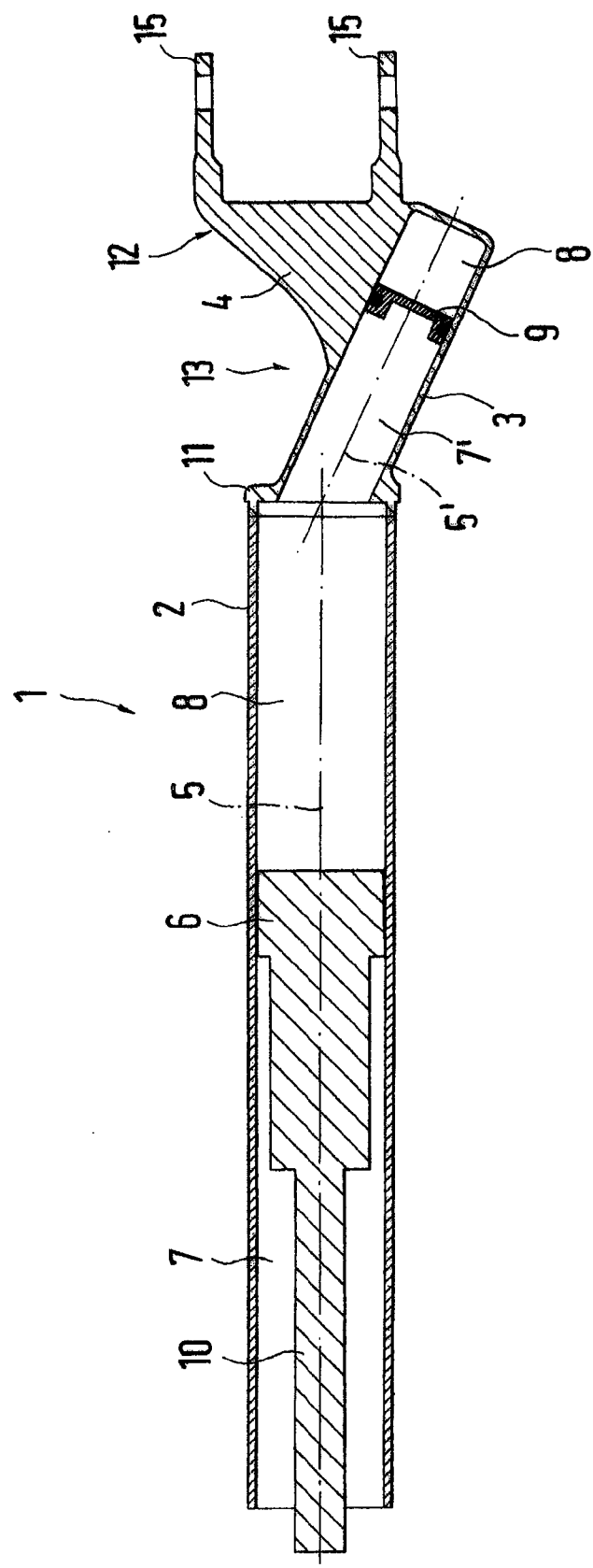
FIG. 1 schematically shows a longitudinal sectional illustration through a vibration damper according to the present invention, FIG. 2 schematically shows a sectional illustration in detail in the area of a compensation cylinder, FIG. 3 schematically shows a perspective view of a compensation cylinder integrated in a damper fork.

FIG. 1 shows a vibration damper 1 according to the present invention having a working cylinder 2, a compensation cylinder 3, and a fastening element 4. The illustrated vibration damper 1 is implemented as a single-tube shock absorber. A working piston 6 is provided inside the working cylinder 2, is axially displaceable along a cylinder axis 5 and is provided with throttle units (not shown) for both passage directions. The working piston 6 divides the working cylinder 2 into two working chambers, namely a first working chamber 7, which is situated to the left of the working piston 6 as shown in FIG. 1, and a second working chamber 8, which is situated to the right of the working piston 6 as shown in FIG. 1.

A compensation piston 9 is situated in the compensation cylinder 3 which, similarly to the working piston 6, divides the compensation cylinder 3 into a first working chamber 7' and a second working chamber 8'. The first working chamber 7' of the compensation cylinder 3 is connected to the second working chamber 8 of the working cylinder 2.

During an adjustment movement of the working piston 6 along the cylinder axis 5, hydraulic medium, such as oil, flows from one working chamber of the working cylinder 2 through the throttle units in the working piston 6 into the other working chamber. The volume of a piston rod 10 must be compensated for, which is performed using the compensation cylinder 3. In contrast to the working piston 6, the compensation piston 9 does not have throttle units and separates the two working chambers 7' and 8' from one another by a seal. The compensation piston 9 is thus implemented as a partition piston and causes the fluidic partition of the first working chamber 7' of the compensation cylinder 3 from the second working chamber 8' of the compensation cylinder 3.

The second working chamber 8' of the compensation cylinder 3 is filled with a compressible medium, such as a gas, which is compressed in accordance with the pressure existing in the first working chamber 7' of the compensation cylinder 3. The end of the second working chamber 8' of the compensation cylinder 3 is sealed to the outside in the operating state of the vibration damper 1.

In comparison to the working piston 6, the compensation piston 9 also has no piston rod, but rather is solely guided via an internal mantle surface of the compensation cylinder 3. A homogeneous pressure distribution over the cross-sectional area of the compensation piston 9 prevents the piston 9 from tilting in the compensation cylinder 3. During an adjustment movement of the working piston 6, the compensation piston 9 therefore performs a corresponding adjustment movement along the cylinder axis 5'.

According to the present invention, the compensation cylinder 3 is situated at the longitudinal end of the working cylinder 2 and diagonally thereto. As also shown in FIG. 1, the configuration may be selected so that the cylinder axis 5 (longitudinal central axis) of the working cylinder 2 intersects the cylinder axis 5' (longitudinal central axis) of the compensation cylinder 3. The cylinder axis 5' of the compensation cylinder 3 is preferably inclined by approximately 10 to 60—as shown in FIG. 1 by 25°—to the cylinder axis 5 of the working cylinder 2. The inclination may be selected as a function of an available installation space and shortens the overall length of the vibration damper 1 in any case.

As may also be inferred from FIG. 1 by one of ordinary skill, the compensation cylinder 3 is situated at the front end of the working cylinder 2. A passage cross-section between the second working chamber 8 of the working cylinder 2 and the first working chamber 7' of the compensation cylinder 3 preferably larger than a cross-sectional area of the compensation cylinder 3.

The compensation cylinder 3 is attached to the working cylinder 2 via a flange 11, which is implemented on the compensation cylinder 3 on the working cylinder side and allows a corresponding connection to the working cylinder 2. A connection of this type may be produced, for example, via a screw connection or a welded connection. Of course, it is also contemplated that the flange 11 is provided not on the compensation cylinder 3, but rather on the working cylinder 2.

Figure 2:
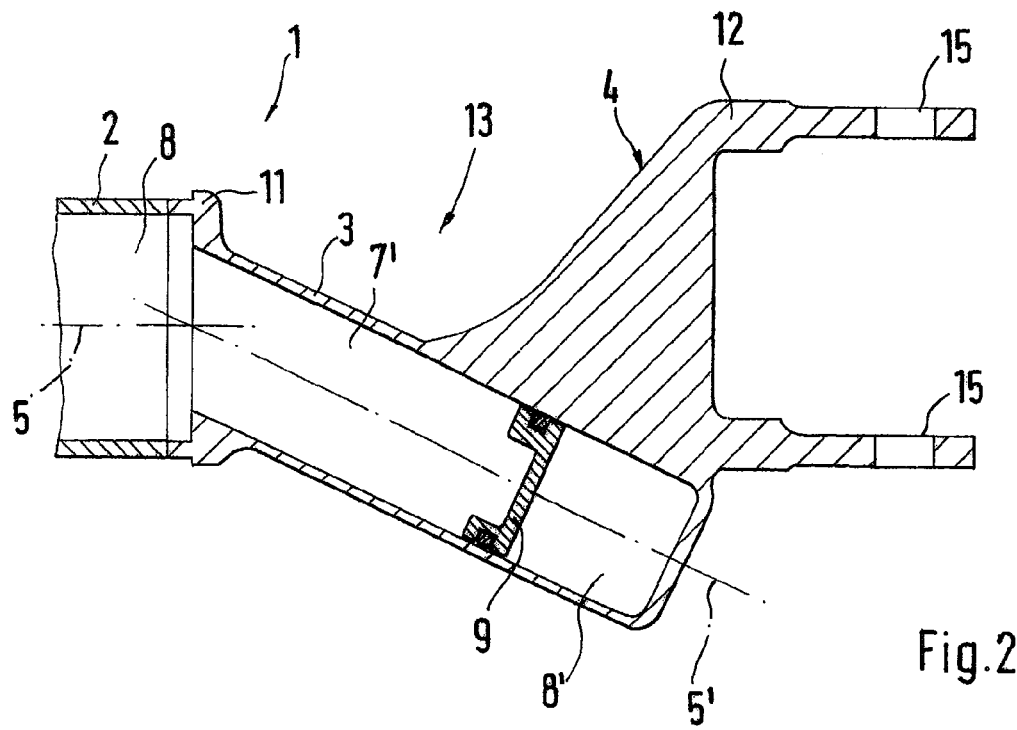
Figure 3:
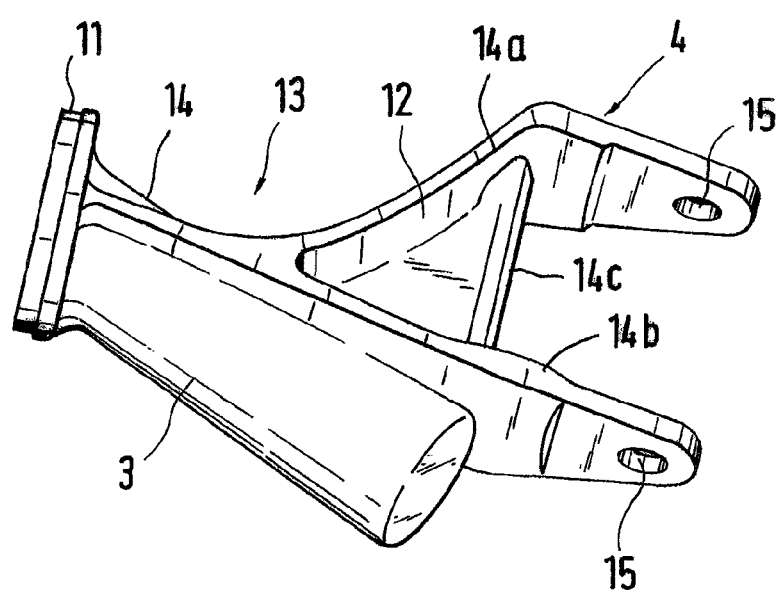

As shown in FIGS. 1 through 3, the compensation cylinder 3 is part of a fastening element 4, that allows fastening of the vibration damper 1 to a suspension construction. As shown in FIGS. 1 through 3, the fastening element 4 is implemented as a damper fork 12 and the compensation cylinder 3 is an integral component of this damper fork 12. In order to be able to produce the damper fork 12 cost-effectively, it is preferably implemented as a one-piece component together with the compensation cylinder 3 and is produced in one work step.

Due to the diagonal configuration of the compensation cylinder 3 at the front end of the working cylinder 2, the damper fork 12 has a hollow channel 13, through which conventional suspension components (not shown), such as a driveshaft may be guided. This is particularly greatly advantageous in regard to a very limited available installation space in the area of the suspension connection. In order to be able to ensure sufficient stability of the fastening element 4, strengthening ribs 14, as shown in FIG. 3, are arranged to pass through the fastening element 4 starting from the flange 11 up to the connection points 15 on the suspension. One strengthening rib 14 first runs on both sides of the compensation cylinder 3 starting from the flange 11 up to approximately half of the axial longitudinal extension of the compensation cylinder 3, to divide there into two strengthening ribs or legs 14a, 14b that run further up to the application points 15. Transverse strengthening by a strengthening rib 14c running between the strengthening ribs 14a, 14b is also provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A vibration damper, comprising,
   a working cylinder having a working piston axially displaceably arranged therein and with throttle units for both passage directions, the working piston dividing the working cylinder into first and second working chambers, and
   a damper fork formed as a one-piece component together with a compensation cylinder having a compensation piston axially displaceably arranged therein, the compensation piston dividing the compensation cylinder into first and second compensation cylinder working chambers with the first compensation cylinder working chamber being operatively connected to communicate with the second working cylinder working chamber wherein the compensation cylinder is situated at and diagonal to a longitudinal end of the working cylinder, the compensation piston being guided only via an inner mantle surface of the compensation cylinder, a passage cross-section between the second working chamber of the working cylinder and the first working chamber of the compensation cylinder being larger than a cross-sectional area of the compensation cylinder;
   the compensation cylinder being an integrated part of a fastening element for fastening the vibration damper to a suspension component along with the damper fork and implemented as a one-piece unit with the fastening element;
   the compensation cylinder with the damper fork disposed on a front side of the working cylinder and the compensation cylinder having a flange for fastening the compensation cylinder at the front side of the working cylinder;
   the working chamber having a longitudinal center axis disposed obliquely to and intersecting a longitudinal axis of the compensation cylinder; and
   the fastening element defining a hollow channel extending to the longitudinal center axis of the working cylinder and provided for receiving a shaft between the compensation cylinder and the damper fork.
2. The vibration damper according to claim 1, wherein the damper is configured as a single-tube shock absorber.
3. The vibration damper according to claim 1, wherein the second compensation cylinder working chamber is gas-filled.

4. The vibration damper according to claim 1, wherein the compensation piston is a partition piston and arranged to fluidically partition the first compensation cylinder working chamber from the second compensation cylinder working chamber.

5. The vibration damper according to claim 1, wherein the second compensation cylinder working chamber is sealed with respect to the outside.

6. The vibration damper according to claim 1, wherein the longitudinal central axis of the working cylinder is inclined by 10° to 60° to the longitudinal central axis of the compensation cylinder.

7. The vibration damper according to claim 6, wherein the compensation piston is a partition piston and arranged to fluidically partition the first compensation cylinder working chamber from the second compensation cylinder working chamber.

8. A motor vehicle, comprising a vibration damper according to claim 1.

9. The motor vehicle according to claim 8, wherein the second compensation cylinder working chamber is gas-filled.

10. The motor vehicle according to claim 9, wherein the compensation piston is a partition piston and arranged to fluidically partition the first compensation cylinder working chamber from the second compensation cylinder working chamber.

11. A vibration damper, comprising:
a working cylinder having a working piston axially displaceably disposed therein and with throttle units for both passage directions, said working piston dividing said working cylinder into first and second working chambers;
a damper fork formed as a one-piece component together with a compensation cylinder having a compensation piston axially displaceably disposed therein, said compensation piston dividing said compensation cylinder into first and second compensation cylinder working chambers with said first compensation cylinder working chamber being operatively connected to communicate with said second working cylinder working chamber wherein said compensation cylinder is situated at and diagonal to a longitudinal end of said working cylinder, said compensation piston being guided only via an inner mantle surface of said compensation cylinder, a passage cross-section between said second working chamber of said working cylinder and said first working chamber of said compensation cylinder being larger than a cross-sectional area of said compensation cylinder, said damper fork further having a hollow channel through which suspension components may be guided;
said damper fork having legs extending from an end distal to said working cylinder.

* * * * *